(12) United States Patent
Gulati et al.

(10) Patent No.: US 11,457,335 B2
(45) Date of Patent: Sep. 27, 2022

(54) LINK IDENTITY DETERMINATION AND SIGNALING

(71) Applicant: QUALCOMM Incorporated, San Diego, CA (US)

(72) Inventors: Kapil Gulati, Hillsborough, NJ (US); Sudhir Kumar Baghel, Hillsborough, NJ (US); Junyi Li, Chester, NJ (US); Hong Cheng, Bridgewater, NJ (US); Zhibin Wu, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 16/558,798

(22) Filed: Sep. 3, 2019

(65) Prior Publication Data

US 2020/0084592 A1    Mar. 12, 2020

Related U.S. Application Data

(60) Provisional application No. 62/728,005, filed on Sep. 6, 2018.

(51) Int. Cl.
*H04W 4/00*  (2018.01)
*H04W 4/12*  (2009.01)
(Continued)

(52) U.S. Cl.
CPC ............ *H04W 4/12* (2013.01); *H04L 1/0061* (2013.01); *H04W 4/06* (2013.01); *H04W 4/46* (2018.02);
(Continued)

(58) Field of Classification Search
CPC ............ H04W 4/40; H04W 4/46; H04W 4/70
See application file for complete search history.

(56) References Cited

U.S. PATENT DOCUMENTS

2016/0007316 A1*  1/2016  Vaidya ............... H04W 64/003
                                                            370/312
2016/0192427 A1*  6/2016  Yun ..................... H04W 76/14
                                                            370/329
(Continued)

OTHER PUBLICATIONS

ERICSSON: "Analysis of ProSe Identifiers", 3GPP TSG-RAN WG2 #87, 3GPP Draft, R2-143570, Analysis of Prose Identifiers, 3rd Generation Partnership Project (3GPP), Mobile Competence Centre, 650, Route Des Lucioles, F-06921 Sophia-Antipolis Cedex, France, vol. RAN WG2, No. Dresden, Germany, Aug. 18, 2014-Aug. 22, 2014, Aug. 17, 2014 (Aug. 17, 2014), XP050794557, pp. 1-11, Retrieved from the Internet: URL:http://www.3gpp.org/ftp/Meetings_3GPP_SYNC/RAN2/Docs/ [retrieved on Aug. 17, 2014] p. 1-p. 2, p. 8-p. 11.

(Continued)

*Primary Examiner* — Bo Hui A Zhu
(74) *Attorney, Agent, or Firm* — Procopio, Cory, Hargreaves & Savitch LLP

(57) ABSTRACT

A method, a computer-readable medium, and an apparatus for V2V, V2X, or D2D communication may be a transmitting device configured to determine a source ID for communication over a link, to determine a destination ID for the communication over the link based on a type of the communication. The transmitting device may be further configured to transmit at least one control message over the link, where the control message(s) indicate the source ID and the destination ID. In certain aspects, a receiving device may be configured to receive the control message over the link, where the control message indicates the source ID and the destination ID. The receiving device may be configured to receive a data message over the link and to determine whether to attempt to decode the data message received over the link based on the source ID and the destination ID indicated in the control message.

30 Claims, 11 Drawing Sheets

(51) Int. Cl.
*H04W 4/70* (2018.01)
*H04W 4/46* (2018.01)
*H04W 80/12* (2009.01)
*H04W 4/06* (2009.01)
*H04W 72/04* (2009.01)
*H04L 1/00* (2006.01)
*H04W 76/11* (2018.01)

(52) U.S. Cl.
CPC ......... *H04W 4/70* (2018.02); *H04W 72/0466* (2013.01); *H04W 76/11* (2018.02); *H04W 80/12* (2013.01)

(56) References Cited

U.S. PATENT DOCUMENTS

| | | | |
|---|---|---|---|
| 2016/0249355 A1 | 8/2016 | Chae et al. | |
| 2017/0142558 A1* | 5/2017 | Xu | H04W 76/18 |
| 2017/0215183 A1 | 7/2017 | Gulati et al. | |
| 2018/0109654 A1* | 4/2018 | Rachlin | H04L 43/065 |
| 2018/0262865 A1 | 9/2018 | Lepp et al. | |
| 2019/0150147 A1* | 5/2019 | Lee | H04L 47/6215 |
| | | | 370/336 |

OTHER PUBLICATIONS

ERICSSON: "Identifiers and Addresses for D2D Communication", 3GPP TSG-RAN WG2 #85bis, 3GPP Draft, R2-141262, Identifiers and Addresses for D2D Communication, 3rd Generation Partnership Project (3GPP), Mobile Competence Centre, 650, Route Des Lucioles, F-06921 Sophia-Antipolis Cedex, vol. RAN WG2, No. Valencia, Spain, Mar. 31, 2014-Apr. 4, 2014, Mar. 22, 2014 (Mar. 22, 2014), XP050817792, 12 pages, Retrieved from the Internet: URL:http://www.3gpp.org/ftp/tsg_ran/WG2_RL2/TSGR2_085bis/Docs/ [retrieved on Mar. 22, 2014], p. 1-p. 2, p. 6-p. 8.
International Search Report and Written Opinion—PCT/US2019/049560—ISA/EPO—May 13, 2020.

* cited by examiner

LINK IDENTITY DETERMINATION AND SIGNALING

CROSS-REFERENCE TO RELATED APPLICATION(S)

This application claims the benefit of U.S. Provisional Application Ser. No. 62/728,005, entitled "LINK IDENTITY DETERMINATION AND SIGNALING FOR NR V2X" and filed on Sep. 6, 2018, which is expressly incorporated by reference herein in its entirety.

BACKGROUND

Technical Field

The present disclosure relates generally to communication systems, and more particularly, to methods and apparatus related to vehicle-to-everything (V2X) communication, vehicle-to-vehicle (V2V), or other Device-to-Device (D2D) communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. Aspects of wireless communication may comprise direct communication between devices, such as in V2X, V2V, and/or D2D communication. There exists a need for further improvements in V2X, V2V, and/or D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a transmitting device, for example, a transmitting User Equipment (UE). The apparatus determines a source ID for communication over a link, wherein the communication is based on V2V communication, V2X communication, or D2D communication. The apparatus determines a destination ID for the communication over the link wherein the source ID and the destination ID are determined based on a type of the communication. The apparatus transmits a control message over the link, where the control message comprises an indication of the source ID and the destination ID.

In another aspect of the disclosure, a method, a computer-readable medium, and an apparatus are provided. The apparatus may be a receiving UE. The apparatus receives a control message over a link, wherein the communication is based on V2V communication, V2X communication, or D2D communication. The control message indicates a source ID and a destination ID for communication over the link. The receiving device is configured to receive a data message over the link. The receiving device is further configured to determine whether to attempt to decode the data message received over the link based on the source ID and the destination ID indicated in the control message, wherein the source ID and the destination ID are based on a type of the communication.

Various additional aspects and features are described in the following detailed description.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
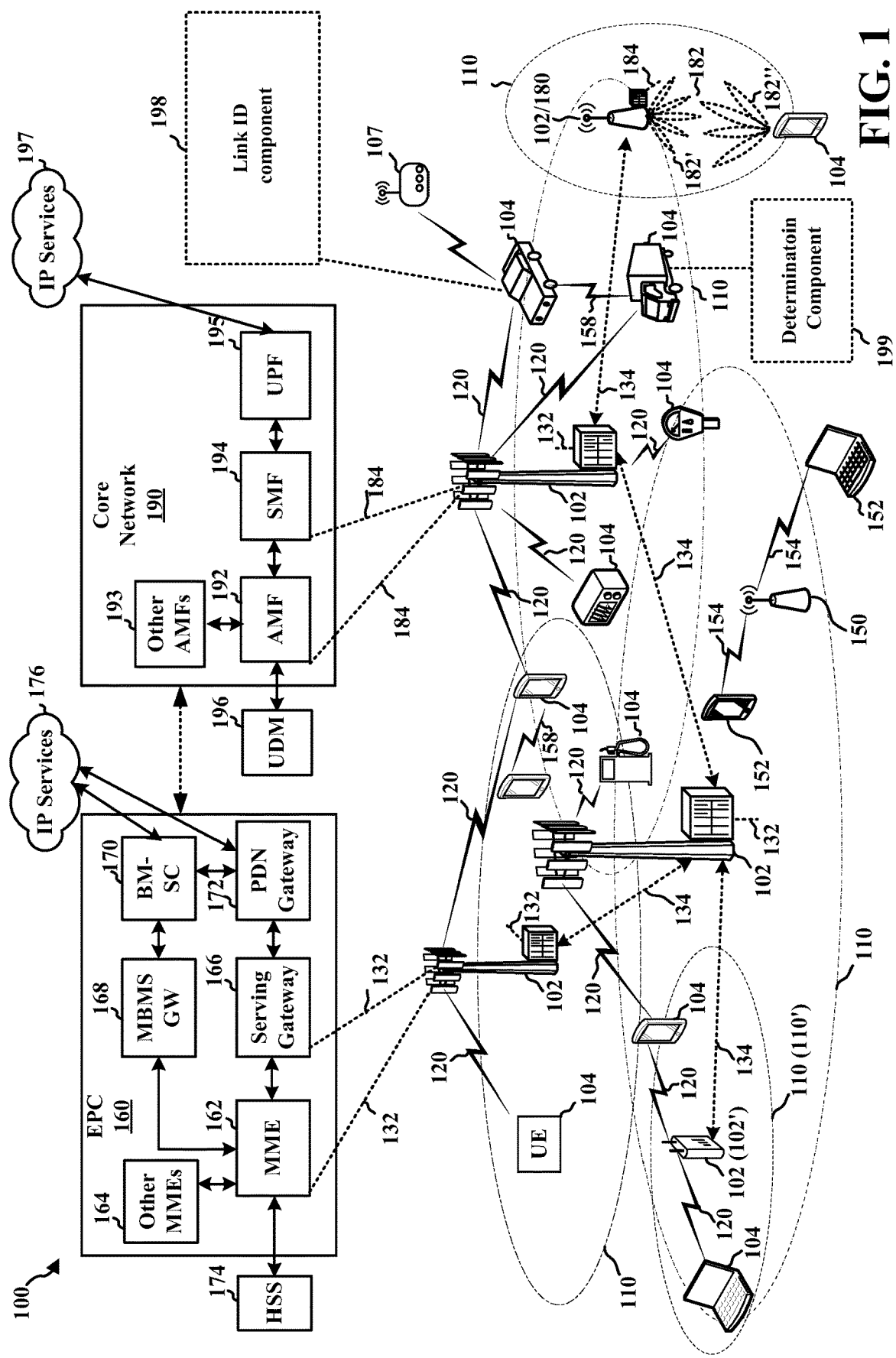
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more stations 102, such as macro base stations. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations 180, such as a gNB, may operate in a traditional sub 6 GHz spectrum, in millimeter wave (mmW) frequencies, and/or near mmW frequencies in communication with the UE 104. When the gNB operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The base station 180, e.g., a mmW base station, may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Referring again to FIG. 1, in certain aspects, a transmitting device, for example, a UE 104 communicating using V2V/V2X/D2D communication, may determine a source ID for communication over a link, determine a destination ID for the communication over the link. The UE 104 may comprise a link ID component 198 configured to determine a link ID for the communication over the link as a function of the source ID and the destination ID, and transmit a control message over the link, where the control message comprises the link ID. In certain aspects, a receiving device, for example, UE 104, may receive the control message over the link, where the control message comprises the link ID as a function of the source ID and the destination ID for communication over the link. The UE may comprise a determination component 199 configured to determine whether to attempt to decode the data message received over the link based on the link ID received in the control message.

Figure 2:
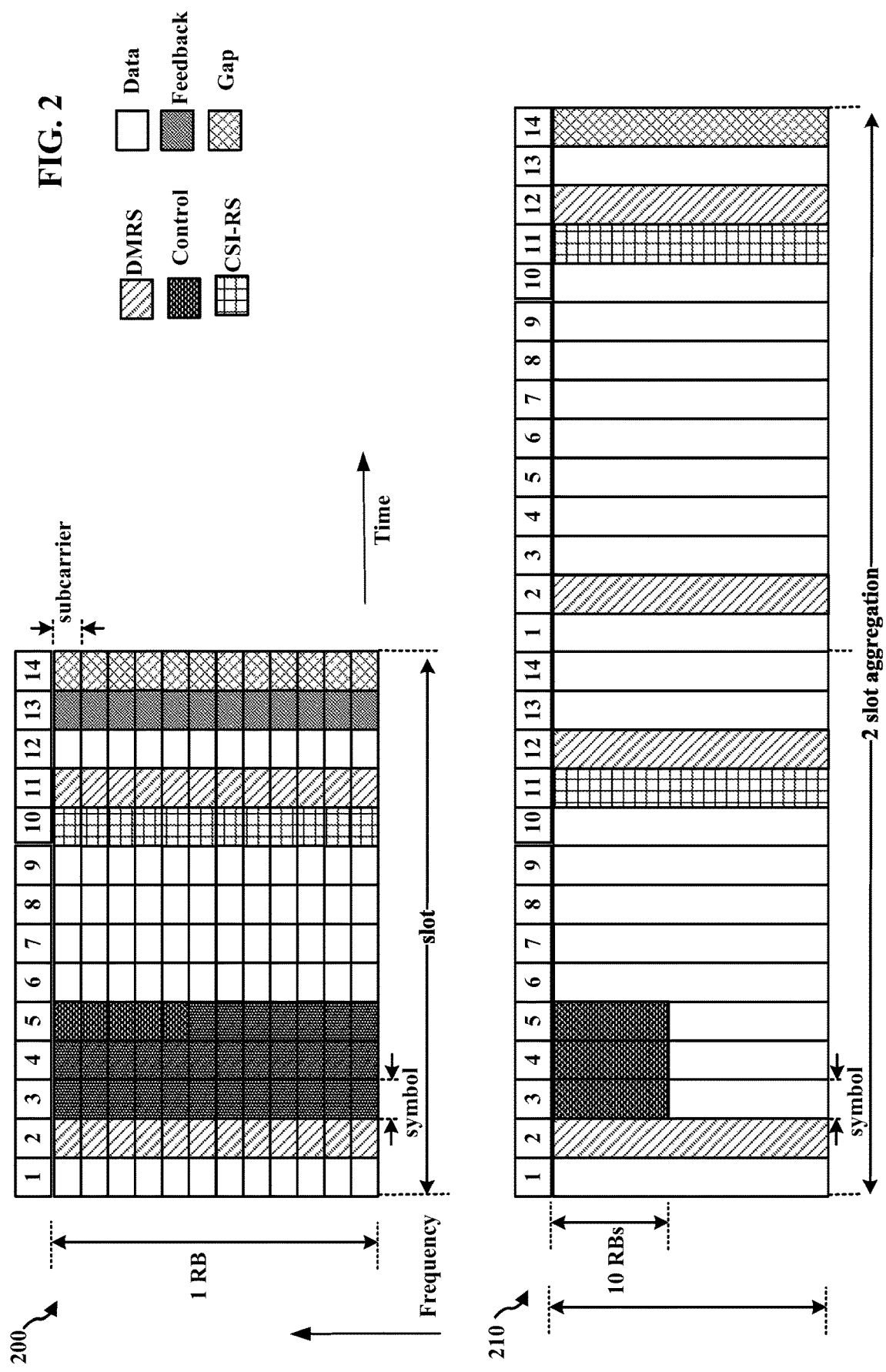
FIG. 2 illustrates example aspects of a sidelink slot structure.

FIG. 2 illustrates example diagrams 200 and 210 illustrating examples slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DMRS). FIG. 2 also illustrates that symbol(s) may comprise CSI-RS. The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
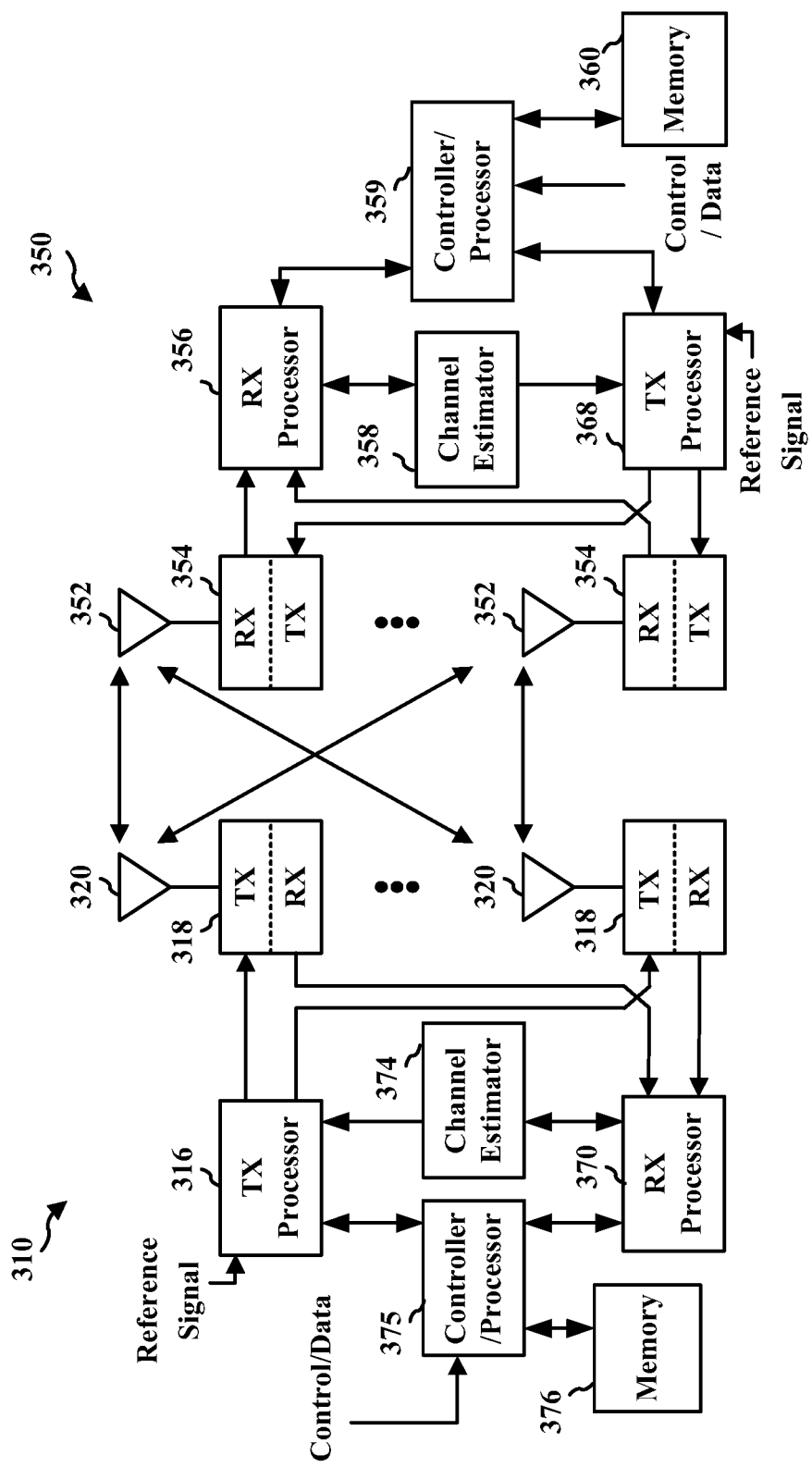
FIG. 3 is a diagram illustrating an example of a base station and UE in an access network.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission. In some configurations, the UE 350 (e.g., vehicle) may operate in a half-duplex mode where the UE 350 may only either transmit or receive at a given time. The half-duplex mode operation may be due to a given deployment scenario (e.g., such as when performing V2X and/or V2V communications) that may desire a half-duplex operation by devices, or due to UE capability (e.g., such as where the UE 350 may have a single TX/RX chain (354TX/RX). In such configurations where the UE 350 may operate in the half-duplex mode, the UE 350 may not perform simultaneous transmission and reception.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with 198 and/or 199 of FIG. 1.

Figure 4:
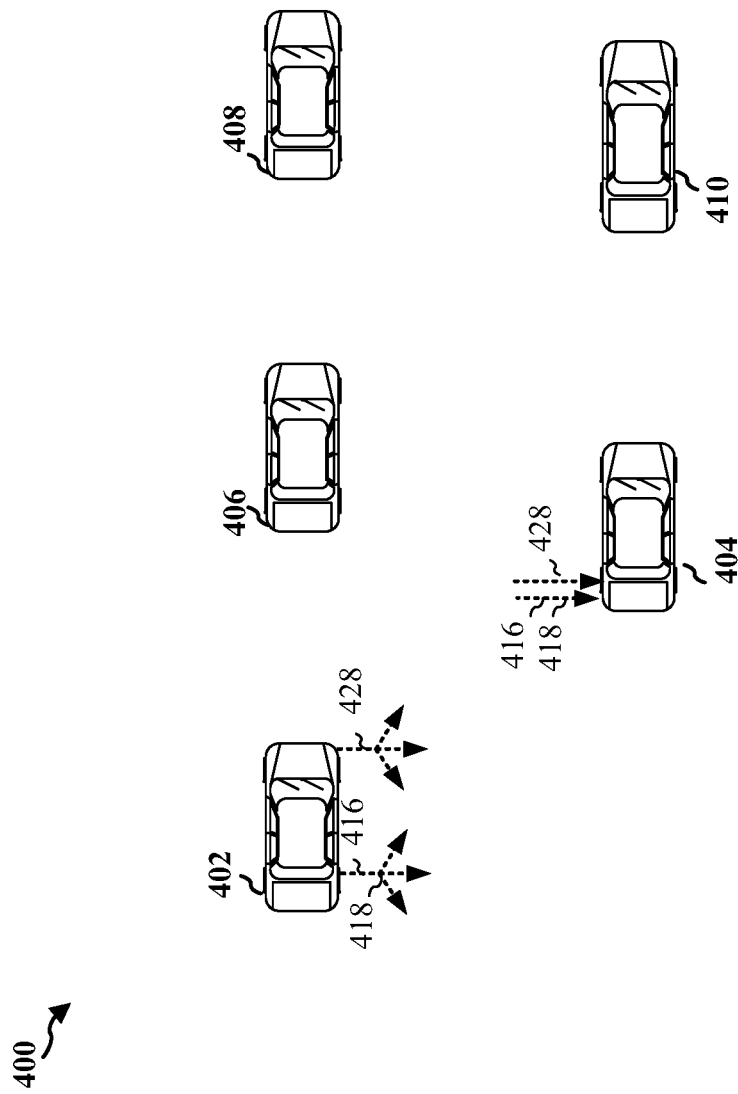
FIG. 4 illustrates an example of signaling between devices (e.g., vehicles), in accordance with one aspect.

FIG. 4 illustrates a diagram 400 of an example of signaling between devices, for example, UEs (e.g., UEs 402, 404, 406, 408, and 410). In one aspect, a transmitting device, for example, a transmitting UE 402, which may be comprised in a vehicle, may communicate based on V2V, V2X, or D2D communication. The communication may be based on 5G/NR, as an example. Such V2V/V2X/D2D communication may involve the transmission of information from a first vehicle, e.g., UE 402, that is received directly by another vehicle, e.g., any of UEs 404, 406, 408, or 410. The communication may be intended for a single vehicle, e.g., unicast communication. In another example, the communication from the first UE 402 may be directed to a group of UEs, e.g., a subset from among UEs 404, 406, 408, 410. In yet another example, the communication may be broadcast to any vehicle within receiving range of the first UE 402. Transmitting devices may need to provide some identifying information so that the receiving vehicles may determine whether to attempt to decode the communication.

In V2X, V2V, or D2D communication with a distributed transmission and connection establishment procedure for example, a transmitting UE and a receiving UE may determine identifier information to include in the transmission. A layer 2 ID (L2 ID), for example, may depend on one or more of application ID, UE ID, or a group ID. For example, the L2 ID may change over time for security. The L2 ID may comprise a number of bits, e.g., 24 bits. The signaling of the transmitting/receiving L2 ID may be split over multiple transmissions. As an example, the L2 ID may be split over a control message and a data transmission, so that a portion of the number of bits is sent in a control message and another portion of the number of bits is sent in a data message. In this disclosure, the terminology "Link ID" may be used to refer to the subset of information bits that are indicated in a control message. The information bits may indicate a destination ID and/or a source ID. It may be desirable to have the portion of the identifier bits that are included in control messages be small in order to reduce the required control overhead. As one example, the length of the Link ID may include, e.g., around 8 bits of the 24 bits of a L2 ID.

The receiving device may use the identifier information signaled in a control message (e.g., link ID) to determine how to handle corresponding data messages. For example, the receiving device may use the identifier information to determine whether the receiving device should decode the data, whether and how to combine the received data over multiple HARQ (re)transmissions previously received from the transmitting device, whether or not to provide NACK feedback to the transmitting device if the control message is received but not the data message, and/or to determine a scrambling sequence for such feedback.

Aspects presented herein enable the transmitting device and the receiving device to communicating using a link ID that has a unified structure that can be applicable to the various types of communication in a 5G/NR V2X/V2V communication system, e.g., unicast communication, multi cast communication, and broadcast communication.

As presented herein, the transmitting and receiving devices may determine a source ID for communication over a link, determine a destination ID for the communication over the link, and transmit a control message 418 over the link, where the control message 418 indicates the destination ID and the source ID. For example, the transmitting device may determine a link ID 416 for the communication over the link as a function of the source ID and the destination ID. The control message may comprise the link ID 416. For example, the transmitting UE may further transmit a data message 428 associated with the control message.

In the example illustrated in FIG. 4, a receiving UE 404 may receive the control message 418 over the link, where the control message indicates a source ID and a destination ID (e.g., the control message may comprise the link ID 416 as a function of the source ID and the destination ID) for communication over the link. The receiving device/UE 404 may further receive the data message 428 over the link, and determine whether to attempt to decode the data message 428 received over the link based on the link ID 416 received in the control message 418. For example, the transmitting UE 402 may communicate with the receiving UE 404 using V2X communication or V2V communication. For example, the link ID may comprises a unified link ID for unicast, multicast, and broadcast communication.

The identifier information (such as the link ID) signaled in the control message may enable the receiving UE to determine whether and how to combine the received data over multiple HARQ (re)transmissions previously received from the transmitting device. For example, the link ID may enable the receiving device to identify whether the received data is a retransmission from the same transmitting device from which the UE received a prior transmission and the same HARQ process as the prior received transmission, in which case the UE may decide to employ HARQ combining for decoding the received data. As another example, a link ID having a different source ID (i.e. sent by a different transmitting device) but still addressed to the receiving UE. Even if the received transmission has a and matching a HARQ process ID with a previously received data the different source ID indication in the link ID, may enable the receiving UE to know that this data cannot be combined from a previously received data because it was sent by a different transmitting device.

The identifier information (such as the link ID) signaled in the control message may be utilized by the receiving UE to determine a feedback. For example, the receiving UE may determine whether or not to decode the data. For this purpose, the link ID may indicate a destination ID. As another example, the receiving UE may determine whether or not to send a NACK when the control message is received but the data transmission is not received. For this purpose, the link ID may similarly indicate the destination ID. As yet another example, the receiving UE may determine a scrambling sequence to scramble the feedback (ACK/NACK). For this purpose, the link ID may indicate a source ID. The link ID presented herein can be signaled in the control message and may be used at the receiving UE to filter data transmissions and provide feedback. Further, aspects presented herein enable a unified link ID design to support unicast, multicast (for NACK-based multicast), broadcast transmissions.

In LTE D2D based communication, the physical layer may be based on broadcast without feedback. For D2D, a control message might include a destination ID signaled in the control message, and the rest of a L2 ID bits may be transmitted in data MAC header. Furthermore, to enable HARQ combining over blind (i.e. non-feedback based) (re)transmission of data, an implicit resource linkage between the transmissions and (re)transmissions of a data packet may be employed. In LTE based V2X, similar to D2D, the physical layer may be broadcast without a need for feedback. Without a Link ID being signaled in control messages, e.g., for LTE V2X, all UEs may be expected to decode all received messages. These example may not be able to meet the needs of NACK based multicast or unicast communication directly between UEs. Furthermore, such designs may lead to inefficiencies by requiring UEs to decode all received communication.

In contrast to LTE D2D and LTE V2X communication, V2X/V2V/D2D communication based on NR may support unicast, broadcast, and/or multicast communications coexisting using a same resource pool. Thus, aspects presented herein provide a common control message design that is capable of supporting the unicast, broadcast, and multicast communication.

As presented herein, V2X, V2V, or D2D communication may include a control message that indicates a source ID and a destination ID for communication over a link. A link ID may be included in the control message communicated over the link and may be a function of both the source ID and the destination ID for communication over the link.

For unicast communication, the destination ID may correspond to an ID for the receiving device, and the source ID may correspond to an ID for the transmitting device. Thus, the link ID may be based, at least in part, on the receiving UE's ID. From the link ID, the receiving UE may determine whether or not the transmission is meant for the receiving UE. Unicast communication may involve feedback from the receiving UE, whether ACK or NACK, to let the transmitting device know whether the control message and/or a corresponding data message are received by the receiving UE. The receiving UE may also use the link ID to determine the scrambling sequence for providing feedback to the transmitting UE. When the receiving UE uses the scrambling sequence for feedback, the transmitting UE also knows the scrambling sequence that the receiving UE will use to scramble the feedback because the transmitting device provided the link ID to the receiving device. The feedback and/or scrambling sequence may be further based on a location, which may be known as a function of the transmission resource. As the link ID depends on the source ID, the link ID may help to avoid feedback collisions to other transmitting UEs. As well, by scrambling the feedback based on a link ID that is a function of the source ID (e.g., transmitting UE ID), the transmitting device may determine that the feedback is intended for it as the source of the control/data message for which feedback is provided. As well, as the link ID may be a function of the destination ID (e.g., receiving UE ID), the transmitting device is able to identify the UE from which it receives the feedback. Further, a link ID comprising in part the source ID and in part the destination ID, may enable a receiving UE to determine whether and how to combine the received data over multiple HARQ (re)transmissions previously received from the transmitting device (source ID).

For broadcast communication, a group ID/destination ID, which may be determined by upper layers, may be sufficient. The group ID/destination ID may enable receiving UEs to filter out received packets based on the link ID present in the control message. Feedback might not be needed for broadcast communication. The inclusion of the source ID in the link ID may enable a receiving UE to identify the source of the data (e.g., from a group of transmitting UEs). The source of the data may be helpful in performing HARQ combining of the received data from a given source ID, e.g., if blind (non-feedback based) HARQ (re)transmission of broadcast data transmission is supported.

For multicast communication, specifically, NACK-based multicast communication, when a control message is received from a transmitting UE, the receiving UE may need to determine whether or not to provide NACK feedback when corresponding data is not received. Basic safety messages (BSMs), for example, LTE V2X-based BSMs, may be used to determine the UEs present in an area. A receiving UE may determine whether or not to provide feedback depending on the location of the transmitting UE (e.g., which may be determined from the BSM) and a desired range. The BSM may have a corresponding range of interest surrounding the transmitting UE. If the receiving UE is not within the range of interest, e.g., not within an indicated distance of the transmitting UE, the receiving UE may determine not to provide feedback. If the UE is within the range and receives the control message without receiving the corresponding data, the UE may determine to provide feedback. The range of interest corresponding to the BSM may be determined by higher layers of the transmitting UE and may be indicated to receiving UEs in the control message. To enable NACK based multicast, a connection or relationship may be needed between an ID used in a BSM and another link ID used in the multicast V2X message.

As one example, the transmitting UE may send a station ID (specific to the transmitting UE) in a BSM message. The station ID may be an application layer ID used for BSM messages. A link ID, which may be a function of the station ID may be derived to use in the transmission of multicast V2X message. In the control message of the multicast V2X message, indicate a token ID, which may be a function of the station ID, may be indicated. A receiving UE may have a list of station IDs, from the BSM(s), for which the receiving UE is required to NACK if the receiving UE receives the control message and does not receive the data transmission. The receiving UE may monitor a list of token IDs, which are function of the list of station IDs, to determine whether to provide NACK feedback. However, such an approach may require a source ID to be present in the control message. For other V2X operations, e.g., unicast messaging, it may be more appropriate for a destination ID to be present in the control message. For example, the receiving UEs may then determine whether or not the message is meant for the receiving UEs and proceed to receive/decode the message and/or determine whether to send NACK, if the message is not accurately received. Having both source and destination IDs (full IDs or function of the IDs, e.g., n-LSBs) may increase the control payload.

Aspects presented herein provide a link ID that meets the unique needs of each of NACK-based multicast communication, unicast communication, and broadcast communication in a unified manner. As well, aspects presented herein avoid a need for a linkage between an application layer station ID and a RAN layer 2 ID used in the transmission. The link ID may be a function of both a source ID and a destination ID. For unicast communication, a transmitting UE ID may be used for the source ID and a receiving UD ID may be used for the destination ID. For broadcast communication, in one case, a broadcast group ID may be used for both the source ID and the destination ID. For broadcast communication, in another case, a broadcast group ID may be used for the destination ID and the transmitting UE ID may be used for the source ID. For multicast communication, a station ID (e.g., an application layer ID) may be used for the source ID and a group ID may be used for the destination ID. For example, the station ID may be an application layer ID that the transmitting UE uses for BSMs. For example, a hash map function of the source ID and the destination ID may be used to generate the link ID.

Figure 5:
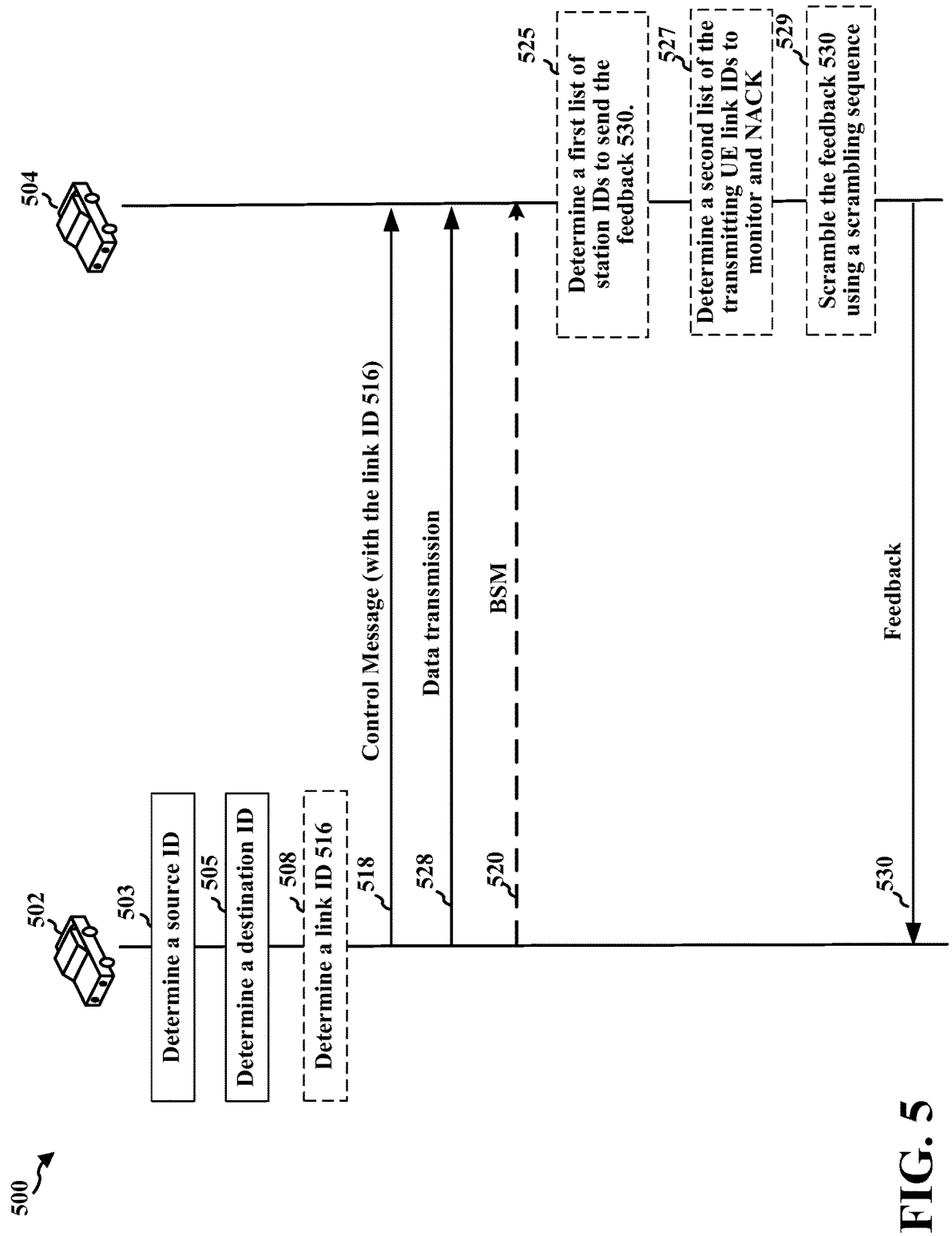
FIG. 5 is a diagram illustrating a link ID determination and signaling in a wireless communication system.

FIG. 5 is a diagram 500 illustrating a link design in a wireless communication between a transmitting UE 502 (e.g., 104, 402, 702, 1050) and a receiving UE (e.g., 104', 404, 750, 1002). The wireless communication may comprise V2X, V2V, or D2D communication. As an example, the wireless communication may be based on NR. Optional aspects are illustrated in dash lines. The transmitting UE 502 and the receiving UE 504 may each be comprised in a vehicle or a device positioned in a vehicle in a V2V/V2X network. In other examples, aspects may be performed by other devices communicating based on V2V, V2X, or D2D communication. For example, a RSU or other device. The transmitting UE 502 may communicate directly with the receiving UE 504 over a communication link including transmitting both control messages and data messages. The control messages may include a link ID that enables the receiving UE 504 to determine whether to decode the corresponding data message, whether to provide feedback, etc. The link ID may be based on both a source ID and a destination ID, and thus may indicate the destination ID and the source ID. Thus, the transmitting device may determine a source ID for communication over the link, as illustrated at 503, and may determine a destination ID for the communication over the link, as illustrated at 505. The determination of the source ID and/or the destination ID may be based on the type of communication transmitted by the transmitting UE 502, e.g., whether the UE 502 is transmitting unicast communication, multicast communication, or broadcast communication. For example, for unicast communication, the source ID may comprise a data link layer ID for the transmitting UE and the destination ID may comprise a data link layer ID for the receiving UE. For broadcast communication, in one case, the source ID may be the same as the destination ID, and the same as the broadcast group ID. For broadcast communication, in another case, a broadcast group ID may be used for the destination ID and the transmitting UE ID may be used for the source ID. For multicast communication, the source ID may be the station ID, which may be the application layer ID that the transmitting UE uses for BSM message, and the destination ID may be the group ID. When the transmitting UE 502 and the receiving UE 504 are running a multicast application, the UEs running the multicast application may determine a group ID (in the V2X layer) based on a (pre)configuration. For example, the application ID may be mapped to the group ID. The group ID may apply to all transmitting UEs and receiving UES running this multicast V2X application session.

Once the transmitting UE has determined the source ID and the destination ID, the transmitting UE 502 may determine a link ID 516 for the communication over the link as a function of the source ID and the destination ID, as illustrated at 508. For example, the link ID may generated using a hash map function of a combination of the source ID and the destination ID to the link ID. For example, the hash map function may reduce a first number of bits of the combination of the source ID and the destination ID to a second number of bits for the link ID, where the second number of bits is smaller than the first number of bits. The transmitting UE 502 may transmit a control message 518 over the link, where the control message 518 comprises the link ID 516. For example, the transmitting UE may further transmit a data message 528. The data message may include further identifying information, such that the link ID comprises a portion of identifying information and the data message comprises another portion of identifying information for the communication. The link ID, determined at 516 for inclusion in the control message 518, may comprises a unified link ID design for unicast, multicast, and broadcast communication.

The receiving UE 504 may receive the control message 518 over the link, where the control message 518 comprises the link ID 516 as a function of the source ID and the destination ID for communication over the link. The receiving UE may use the link ID to determine the source ID and/or the destination ID, e.g., to determine whether communication with the link ID pertains to the receiving UE. The receiving UE 504 may further receive the data message 528 over the link, and may determine whether to attempt to decode the data message 528 received over the link based on the link ID 516 received in the control message 518. The receiving UE 504 may also use the source ID and/or destination ID information in the link ID of the control message 518 to determine whether to provide feedback to the transmitting UE 502.

For example, the receiving UE 504 may receive multicast communication, such as a plurality of Basic Safety Messages (BSMs) 520. The receiving UE 504 may determine whether to send a feedback 530 for each of the plurality of BSMs 520 based on at least one of a location of the receiving UE 504, a range for a particular BSM message, or a Quality of Service for the particular BSM message. As the link ID for multicast communication may include a station ID as a source ID, the receiving UE 504 may determine a station ID for each BSM from the plurality of BSMs. The UE may determine whether to send feedback for each of the BSMs, e.g., based on any of the station ID for a particular BSM, the desired range for the particular BSM, the location of the receiving UE, QoS for the particular BSM, etc. The UE may generate and maintain a first list of station IDs for which the receiving UE determines to send feedback 530, as illustrated at 525.

For example, the receiving UE 504 may determine the link ID 516 based on the group ID and the station ID for each station ID in the list of station IDs, and maintain a second list of the data link layer IDs for the transmitting UEs for which the receiving UE 504 determines to send the feedback, at 527. The second list of the data link layer IDs may be determined as a function of the group ID and the station ID for multicast V2X messages. Then, the receiving UE 504 may determine whether to send feedback 530 to the transmitting UE 502 based on whether the link ID 516 received in the control message 518 is in the second list of link IDs maintained at the receiving UE 504. The receiving UE may send feedback 530 to the transmitting UE 502 when the link ID 516 received in the control message 518 is in the second list of link IDs maintained at the receiving UE 504. The feedback may comprise a NACK when the receiving UE 504 receives the control message 518, but does not receive the data transmission 528.

The receiving UE 504 may scramble the feedback, at 529, using a scrambling sequence as a function of at least one of the link ID for the link or a station ID for the corresponding BSM, prior to transmitting the feedback at 530. If a V2X/V2V/D2D multicast control message 518 is received that corresponds to the second list of the transmitting link IDs, for which the receiving UE 504 wishes to send NACK, and the UE fails to receive the data transmission 528, the receiving UE 504 may scramble the NACK feedback at 529 using a scrambling sequence as a function of the transmitting link ID or a station ID for the corresponding BSM. Then, the UE may transmit the scrambled NACK at 530.

For example, the scrambling sequence may be further based on a cyclic redundancy check (CRC) of the control message 518. In one aspect, the scrambling sequence may be determined based on a function of at least one of the link ID for the link or a station ID for the corresponding BSM, and further based on the CRC of the control message 518. This approach provides further randomization when there is collision of one or more subchannels being used by different transmitting UEs.

The link ID disclosed herein provides a unified link ID that meets the individual needs of NACK based multicast communication, unicast communication and broadcast communication. The link ID may comprise a hash function of the source ID and destination ID, e.g., for NACK based multicast communication. Furthermore, the link ID design enables receiving UE to filter the messages at a MAC layer. For example, the receiving UE may filter out messages for which the receiving UE is not a part of the intended group. Such filtering may help the UE to avoid decoding messages that do not pertain to the UE. The use of a destination ID along with a source ID to generate the link ID enables a UE to distinguish between messages sent to different groups by the same transmitting UE. For example, a transmitting UE, using a same station ID, may transmit messages to two or more groups, and a given receiving UE may only be a part of one of the groups. Through the link ID presented herein, the receiving UE will be able to filter out the messages from the transmitting UE for groups that do not apply to the receiving UE.

Figure 6:
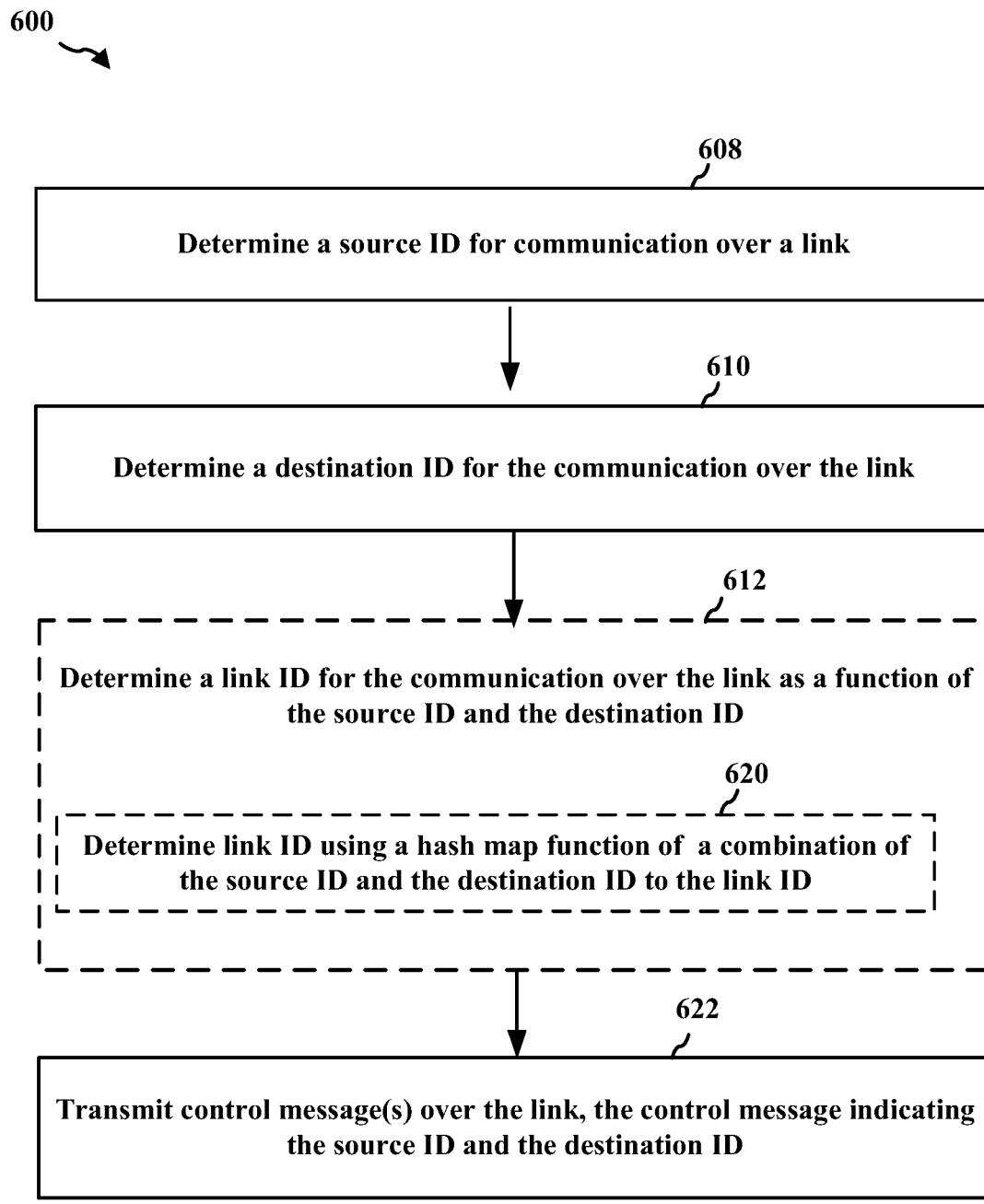
FIG. 6 is a flowchart of a method of wireless communication.

FIG. 6 is a flowchart 600 of a method of wireless communication at a transmitting UE. The method may be performed, for example, by the transmitting UE (e.g., UE 104, 402, 502, 1050, the apparatus 702/702', processing system 814, which may include memory and which may be an entire UE or a component of a UE, e.g., including any of TX processor 316, RX processor 370 and/or controller/processor 375) communicating with a receiving UE (e.g., UE 104', 404, 504) in a wireless communication. The wireless communication may comprise V2X, V2X, or other D2D communication. The transmitting UE may comprise a vehicle or a device installed in a vehicle. To facilitate an understanding of the techniques and concepts described herein, the method of flowchart 600 may be discussed with reference to the examples illustrated in FIGS. 4 and 5. Optional aspects may be illustrated in dashed lines.

At 608, the transmitting UE may determine a source ID for communication over a link. The determination may be based, in part, on whether the communication is unicast, broadcast, or multicast communication. The source ID may be determined by source ID component 710 of apparatus 702, for example.

At 610, the transmitting UE may determine a destination ID for the communication over the link. Similar to the source ID, the destination ID may be determined, in part, based on the type of communication that the transmitting UE intends to transmit, e.g., based on whether the communication will be unicast, broadcast, or multicast. The destination ID may be determined by destination ID component 712 of apparatus 702, for example.

For example, for unicast communication, the source ID may comprise a data link layer ID for the transmitting UE and the destination ID may comprise a data link layer ID for the receiving UE. As another example, for broadcast communication, the source ID may be the same as the destination ID, and the source ID and the destination ID both comprise a broadcast group ID. As another example, for multicast communication, the source ID may be the station ID, which may be the application layer ID that the transmitting UE uses for BSM message, and the destination ID may be the group ID.

At 612, the transmitting UE may determine a link ID for the communication over the link as a function of the source ID and the destination ID. For example, link ID component 714 of apparatus 702 may determine the link ID. The function may comprise a hash map function of a combination of the source ID and the destination ID to the link ID, as illustrated at 620. Thus, the link ID may be generated using a hash map function based on the determined source ID and the determined destination ID for the communication. For example, the hash map function may reduce a first number of bits of the combination of the source ID and the destination ID to a second number of bits for the link ID, where the second number of bits is smaller than the first number of bits.

When the transmitting UE and the receiving UE are running a multicast application, the UEs running the multicast application may determine a group ID (in the V2X layer) based on a configuration. For example, the application ID may be mapped to the group ID. The group ID may apply to all transmitting UEs and receiving UES running this multicast V2X application session.

At 622, the transmitting UE may transmit at least one control message over the link, where the control message(s) indicate the source ID and the destination ID. For example, the control message may be transmitted by control message component 716 and/or transmission component 706 of apparatus 702. As an example, the control message may comprise a link ID. The link ID may comprise a unified link ID for unicast, multicast, and broadcast communication. As illustrated in FIG. 5, the transmitting UE may also transmit data, e.g., 528, associated with the control message (e.g., 518). Based on the type of communication, the transmitting UE may also receive feedback from the receiving UE, e.g., 530. The feedback may be received, e.g., by reception component 704 of apparatus 702. The feedback may be scrambled based on the link ID. Thus, the transmitting UE may determine whether the received feedback is intended for the transmitting UE and/or the source of the feedback based on the link ID used to scramble the feedback. The feedback may comprise, e.g., a NACK indicating that the receiving UE did not receive the data. The transmitting UE may determine to retransmit the data based on the feedback.

Figure 7:
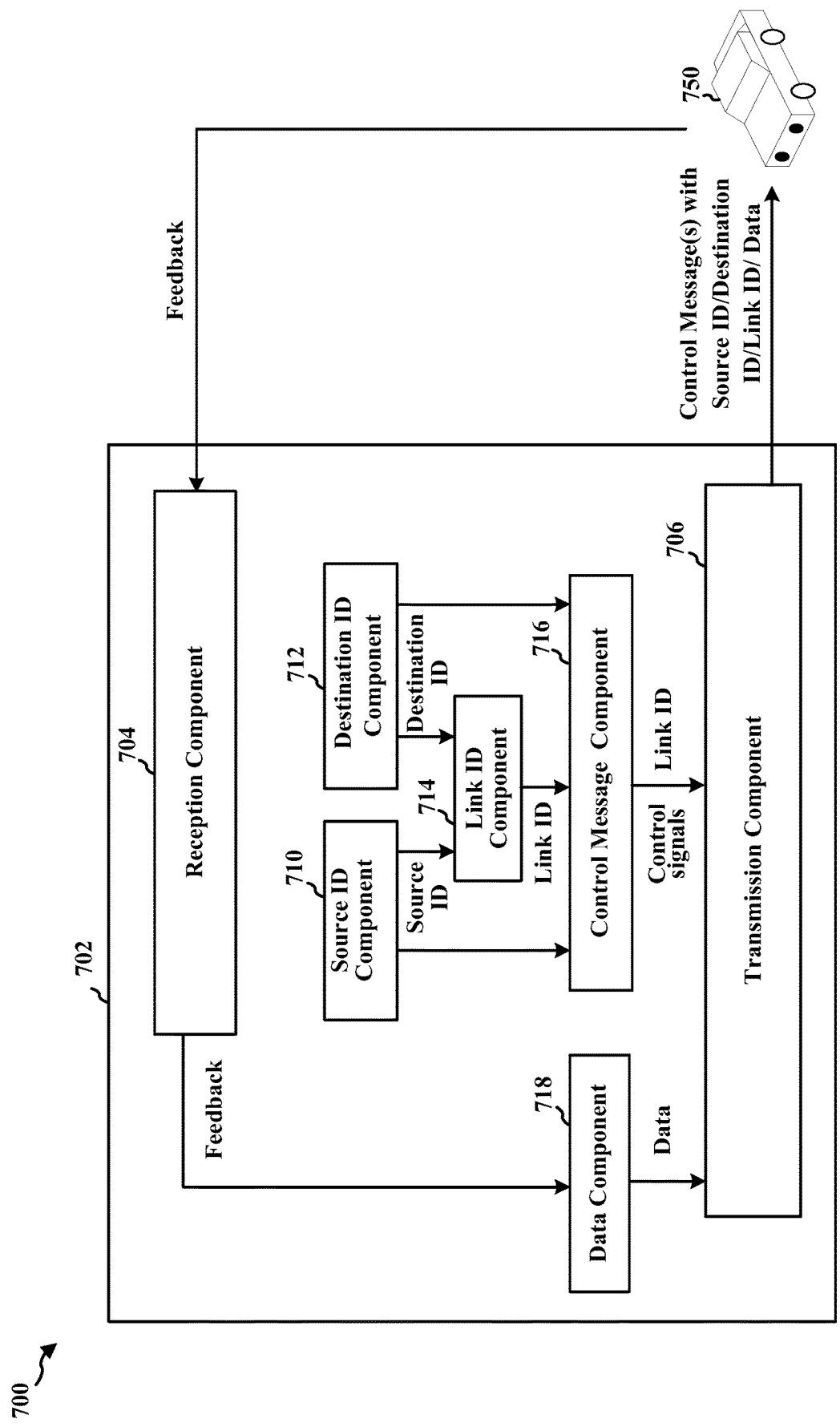
FIG. 7 is a conceptual data flow diagram illustrating the data flow between different means/components in an example apparatus.

FIG. 7 is a conceptual data flow diagram 700 illustrating the data flow between different means/components in an example apparatus 702. The apparatus may be a transmitting UE (e.g., UE 104, 402, 502, the apparatus 702/702', 1050, etc.) communicating with a receiving UE (e.g., UE 104', 404, 504, 750, the apparatus 1002/1002', etc.) in a wireless communication. The wireless communication may comprise a V2X or V2V communication, as described herein.

The apparatus includes a source ID component 710 configured to determine the source ID for communication over a link, e.g., as described in connection with 608 in FIG. 6. The apparatus includes a destination ID component 712 configured to determine the destination ID for communication over a link, e.g., as described in connection with 610 in FIG. 6. The apparatus may include a link ID component 714 configured to determine a link ID for the communication over the link as a function of the source ID and the destination ID, e.g., as described in connection with 612 in FIG. 6.

The apparatus includes a transmission component 706 for transmitting data, control messages, etc. The apparatus includes a control message component 716 that transmits, via the transmission component 706, a control messages over the link, where the control message indicates the source ID and the destination ID, e.g., as described in connection with 622 in FIG. 6. The apparatus includes a data component 718 that transmits, via the transmission component 706, data transmissions. The apparatus further includes a reception component 704 that receives feedback from receiving UEs regarding reception of the data transmission(s).

The apparatus may include additional components that perform each of the blocks of the algorithm in the aforementioned flowcharts of FIGS. 5-6. As such, each block in the aforementioned flowcharts of FIGS. 5-6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
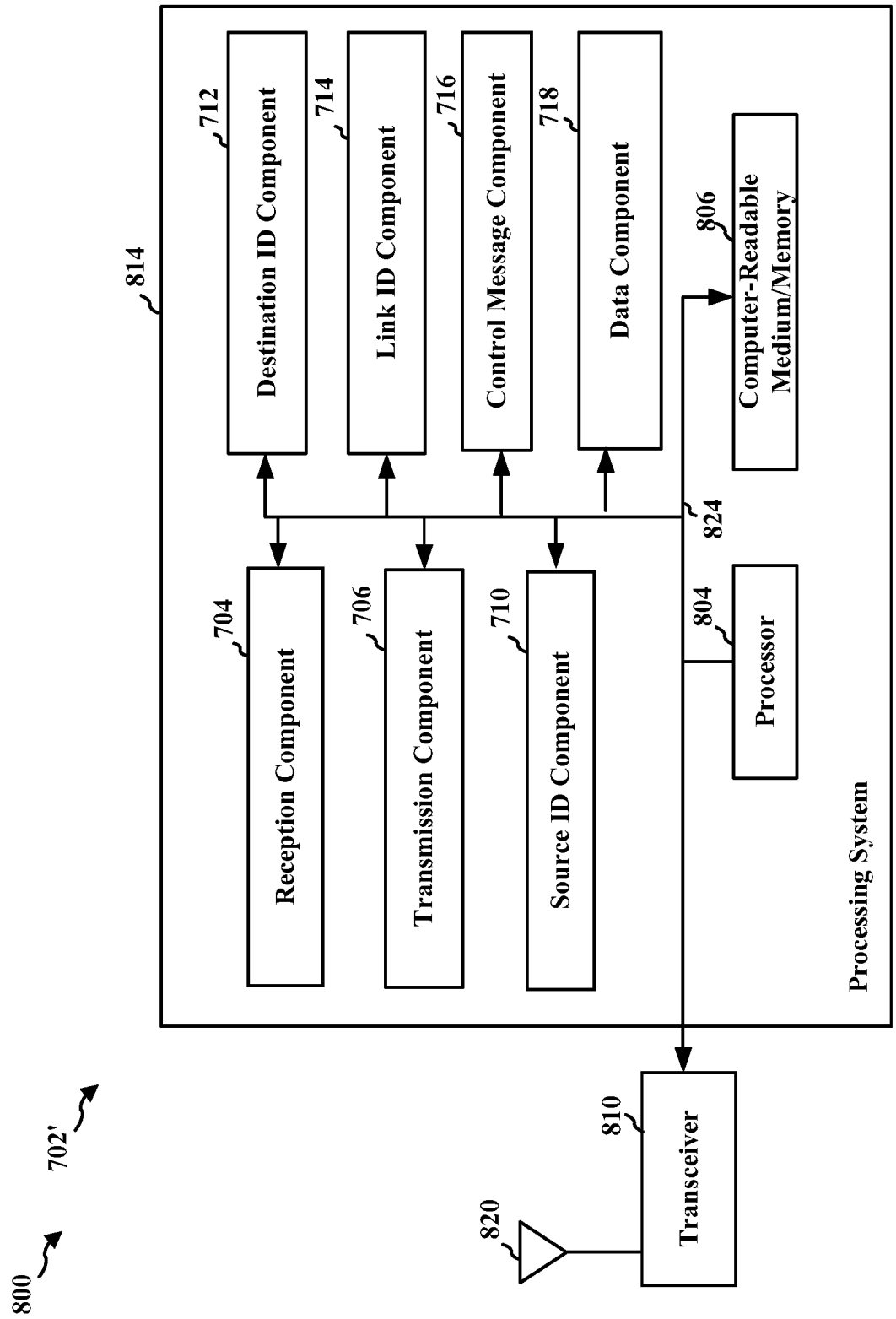
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 710, 712, 714, 716, 718 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/ memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 710, 712, 714, 716, 718. The components may be software components running in the processor 804, resident/stored in the computer readable medium/memory 806, one or more hardware components coupled to the processor 804, or some combination thereof. In one configuration, the processing system 814 may be a component of the UE 350 and may include the memory 360 and/or at least one of the TX processor 368, the RX processor 356, and the controller/processor 359. Alternatively, the processing system 814 may comprise the entire UE.

In one configuration, the apparatus 702/702' for wireless communication may include includes means for determining a source ID for communication over a link. The apparatus may include means for determining a destination ID for the communication over the link. The apparatus may include means for determining a link ID for the communication over the link as a function of the source ID and the destination ID. The apparatus may include means for transmitting a control message over the link, where the control message that indicates the source ID and the destination ID. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
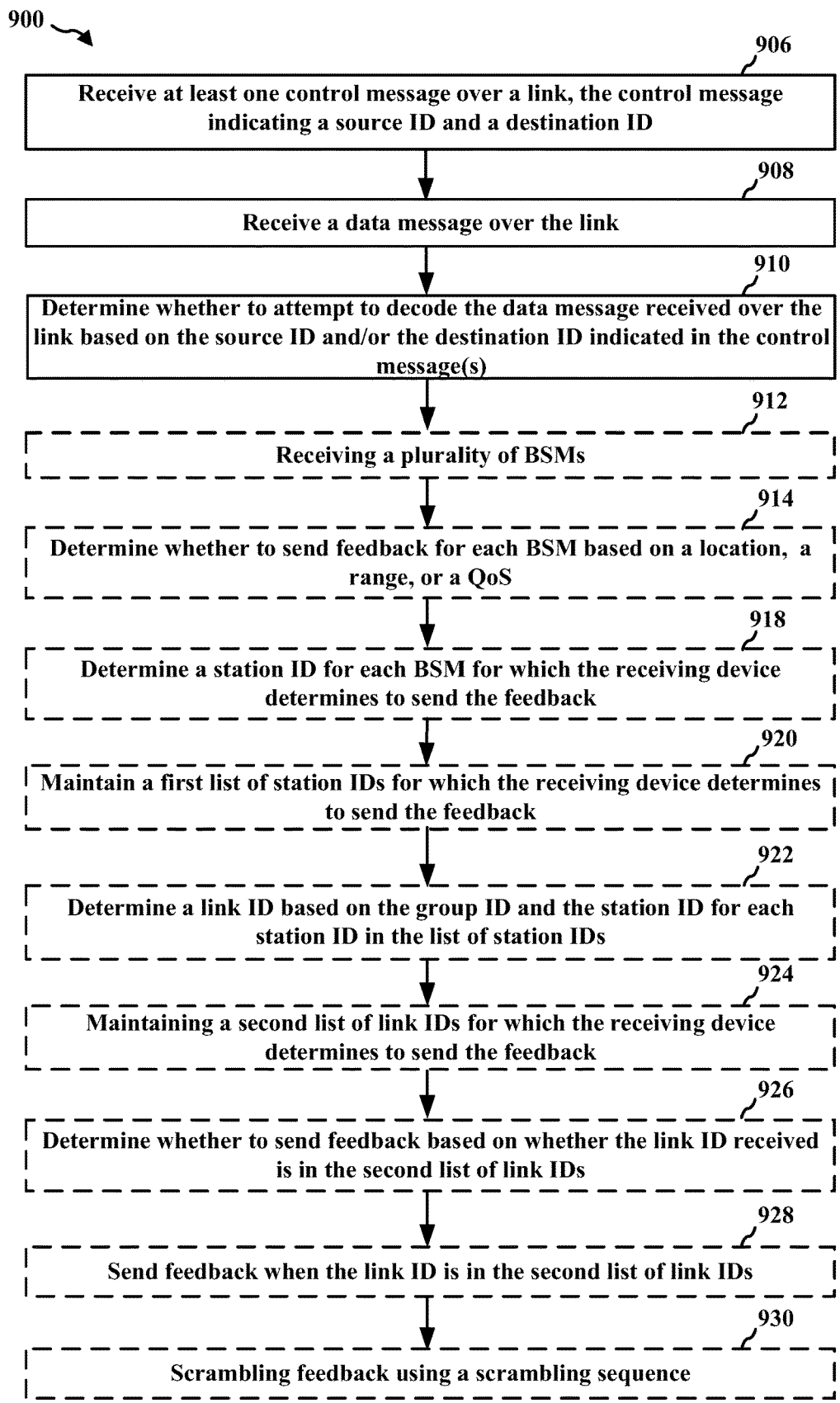
FIG. 9 is a flowchart of a method of wireless communication.

FIG. 9 is a flowchart 900 of a method of wireless communication at a receiving UE. The method may be performed, for example, by the receiving UE (e.g., UE 104', 404, 504, 750, the apparatus 1002/1002'; processing system 1114 that may include memory and which may be an entire UE or a component of a UE) in a wireless communication. The wireless communication may comprise V2V, V2X, or D2D communication. The communication may be based on NR, for example. As an example, the receiving UE may be comprised in a vehicle or a device associated with a vehicle. To facilitate an understanding of the techniques and concepts described herein, the method of flowchart 900 may be discussed with reference to the examples illustrated in FIGS. 4-5. Optional aspects may be illustrated in dashed lines.

At 906, the receiving UE may receive at least one control message over a link, where the control message(s) comprises an indication of a source ID and a destination ID. The control message may comprise a link ID as a function of the source ID and the destination ID for communication over the link. FIG. 5 describes an example of a control message 518 comprising a link ID. The reception of the control message may be performed by reception component 1004 of apparatus 1002, for example.

At 908, the receiving UE may further receive a data message over the link. The reception of the data message may be performed by reception component 1004 of apparatus 1002, for example. The data message may be associated with the control message.

At 910, the receiving UE may determine whether to attempt to decode the data message received over the link based on the source ID and/or the destination ID indicated in the control message(s). The source ID and the destination ID may be based on a type of the communication (e.g., whether the communication is unicast communication, multicast communication, or broadcast communication). For example, the determination may be performed by determination component 1008 of apparatus 1002. As an example, the receiving UE may determine whether to attempt to decode the data message based on the link ID received in the control message. In some aspects, the link ID may comprise a unified link ID for unicast, multicast, and broadcast communication.

The link ID may be a function of the source ID and the destination ID, e.g., as described in connection with FIGS. 5, 6, and 7. The function may comprise a hash map function, such that the link ID is generated using a hash map function of a combination of the source ID and the destination ID for the communication. For example, the hash map function may reduce a first number of bits of the combination of the source ID and the destination ID to a smaller, second number of bits for the link ID.

In some aspects, for unicast communication, the source ID may comprise a data link layer ID for the transmitting UE and the destination ID may comprise a data link layer ID for the receiving UE.

In some aspects, for broadcast communication, the source ID may be the same as the destination ID, and the source ID and the destination ID both comprise a broadcast group ID.

In some aspects, for multicast communication, the source ID may be the station ID, which may be the application layer ID that the transmitting UE uses for BSM message, and the destination ID may be the group ID.

At 912, for example, wherein the communication comprises multicast communication, the receiving UE may receive a plurality of BSMs. The reception may be performed by reception component 1004 of apparatus 1002. At 914, the receiving UE may determine whether to send a feedback for each of the plurality of BSMs based on at least one of a location of the receiving UE, a range for a particular BSM message, or a Quality of Service for the particular BSM message. The determination may be performed by determination component 1008 of apparatus 1002, for example. At 918, the receiving UE may determine a station ID for each BSM from the plurality of BSMs for which the receiving UE determines to send the feedback. For example, the station ID may be performed by station ID component 1012 of apparatus 1002. At 920, the receiving UE may maintain a first list of station IDs for which the receiving UE determines to send the feedback. For example, first list component 1014 of apparatus 1002 may maintain the list.

At 922, the receiving UE may determine the link ID based on the group ID and the station ID for each station ID in the list of station IDs. For example, the link ID may be determined by link ID component 1016 of apparatus 1002. At 924, the receiving UE may maintain a second list of the data link layer IDs for the transmitting UEs for which the receiving UE determines to send the feedback. For example, the second list may be maintained by second list component 1018 of apparatus 1002. At 926, the receiving UE may determine whether to send feedback to the transmitting UE based on whether the link ID received in the control message is in the second list of link IDs maintained at the receiving UE.

At 928, the receiving UE may send feedback to the transmitting UE when the link ID received in the control message is in the second list of link IDs maintained at the receiving UE. The feedback may be sent by transmission component 1006 of apparatus 1002.

At 930, the receiving UE may scramble the feedback using a scrambling sequence as a function of at least one of the link ID for the link or a station ID for the corresponding BSM. For example, the scrambling may be performed by scrambling component 1020 of apparatus 1002. In some aspects, the scrambling sequence may be further based on a cyclic redundancy check (CRC) of the control message. As described in connection with FIG. 6, the transmitting UE may use the feedback to determine whether the receiving UE successfully received the data and/or to determine whether to retransmit the data to the receiving UE.

Figure 10:
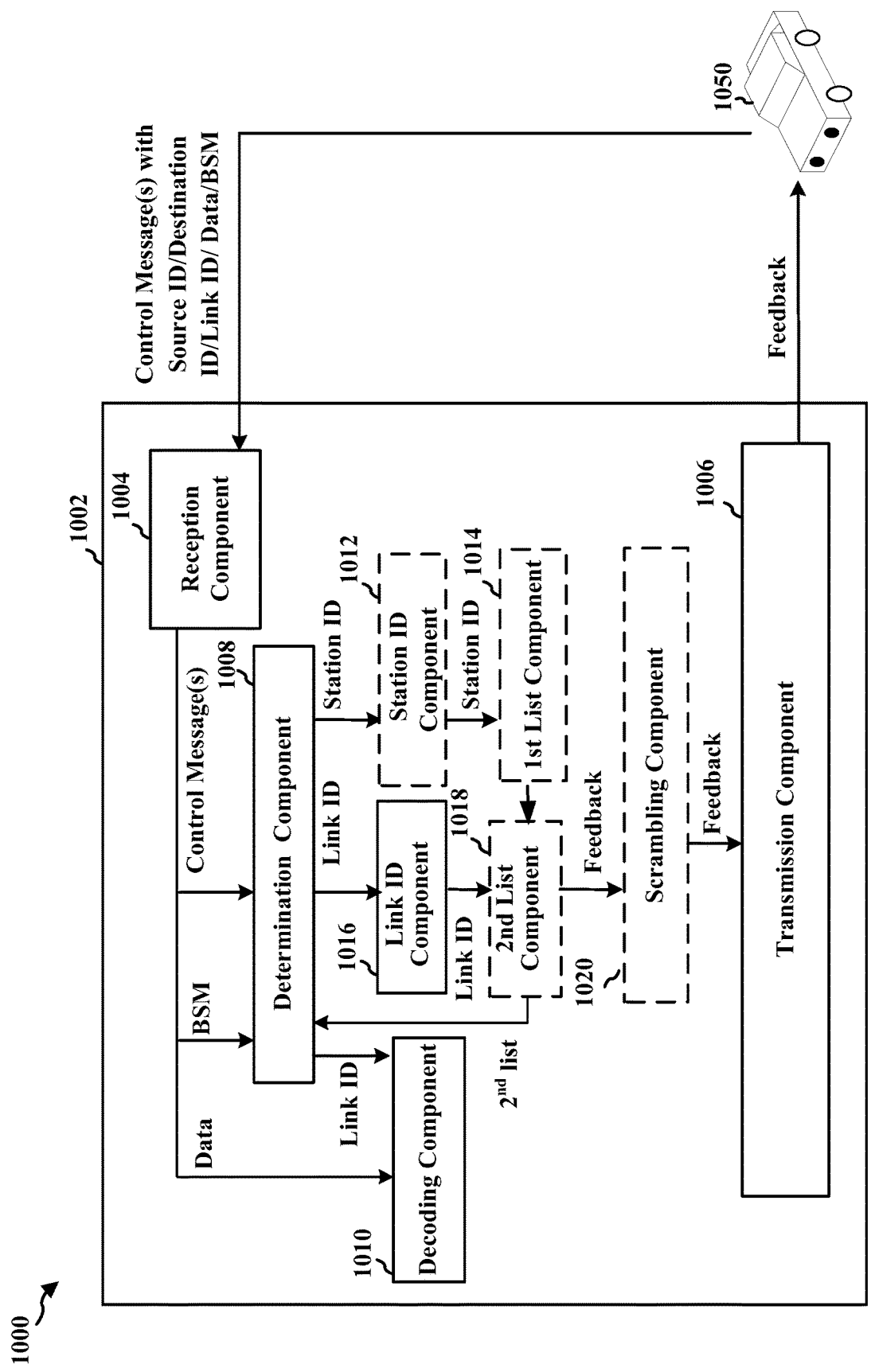
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a receiving UE or a component of a UE (e.g., UE 104', 350, 404, 504) communicating with a transmitting UE (e.g., UE 104, 402, 502, the apparatus 702/702', the apparatus 1050, etc.) in a wireless communication. The wireless communication may comprise a V2X, V2V, or D2D communication, as described herein.

The apparatus includes a reception component 1004 that receives a control message, data transmission and/or BSM messages over a link, where the control message comprises an indication of the source ID and the destination ID, e.g., as described in connection with 906, 908, 912 of FIG. 9. The control message may comprise a link ID as a function of the source ID and the destination ID for communication over the link.

The apparatus includes a determination component 1008 that determines, e.g., whether to attempt to decode a data message received over the link based on the source ID and destination ID indicated in the control message, e.g., as described in connection with 910 of FIG. 9. In some aspects, the determination may be based on a link ID in the control message. The apparatus includes a decoding component 1010 that decodes the data message based on the determination.

In some aspects, the reception component 1004 may receive a plurality of BSMs. The determination component may further determine whether to send a feedback for each of the plurality of BSMs based on at least one of a location of the receiving UE, a range for a particular BSM message, or a Quality of Service for the particular BSM message.

The apparatus may include a station ID component 1012 that determines a station ID for each BSM from the plurality of BSMs for which the apparatus determines to send the feedback, e.g., as described in connection with 918 of FIG. 9. The apparatus may include a first list component 1014 that maintains a first list of station IDs for which the determination component 1008 determines to send the feedback, e.g., as described in connection with 920 in FIG. 9.

The apparatus may include a link ID component 1016 that determines the link ID based on the group ID and the station ID for each station ID in the first list of station IDs, e.g., as described in connection with 922 in FIG. 9. The apparatus may include a second list component 1018 that maintains a second list of the data link layer IDs for the transmitting UE for which the determination component 1008 determines to send the feedback, e.g., as described in connection with 924 in FIG. 9. The determination component 1008 may determine whether to send feedback to the transmitting UE based on whether the link ID received in the control message is in the second list of link IDs, e.g., as described in connection with 926 in FIG. 9.

The apparatus may include a transmission component 1006 that sends feedback to the transmitting UEs when the link ID received in the control message is in the second list of link IDs, e.g., as described in connection with 928 in FIG. 9.

The apparatus may include a scrambling component 1020 that scrambles the feedback using a scrambling sequence as a function of at least one of the link ID for the link or a station ID for the corresponding BSM, e.g., as described in connection with 930 in FIG. 9. In some aspects, the scrambling sequence may be further based on a cyclic redundancy check (CRC) of the control message.

The apparatus may include additional components that perform each of the blocks of the algorithm in the aforementioned flowcharts of FIGS. 5 and 9. As such, each block in the aforementioned flowcharts of FIGS. 5 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
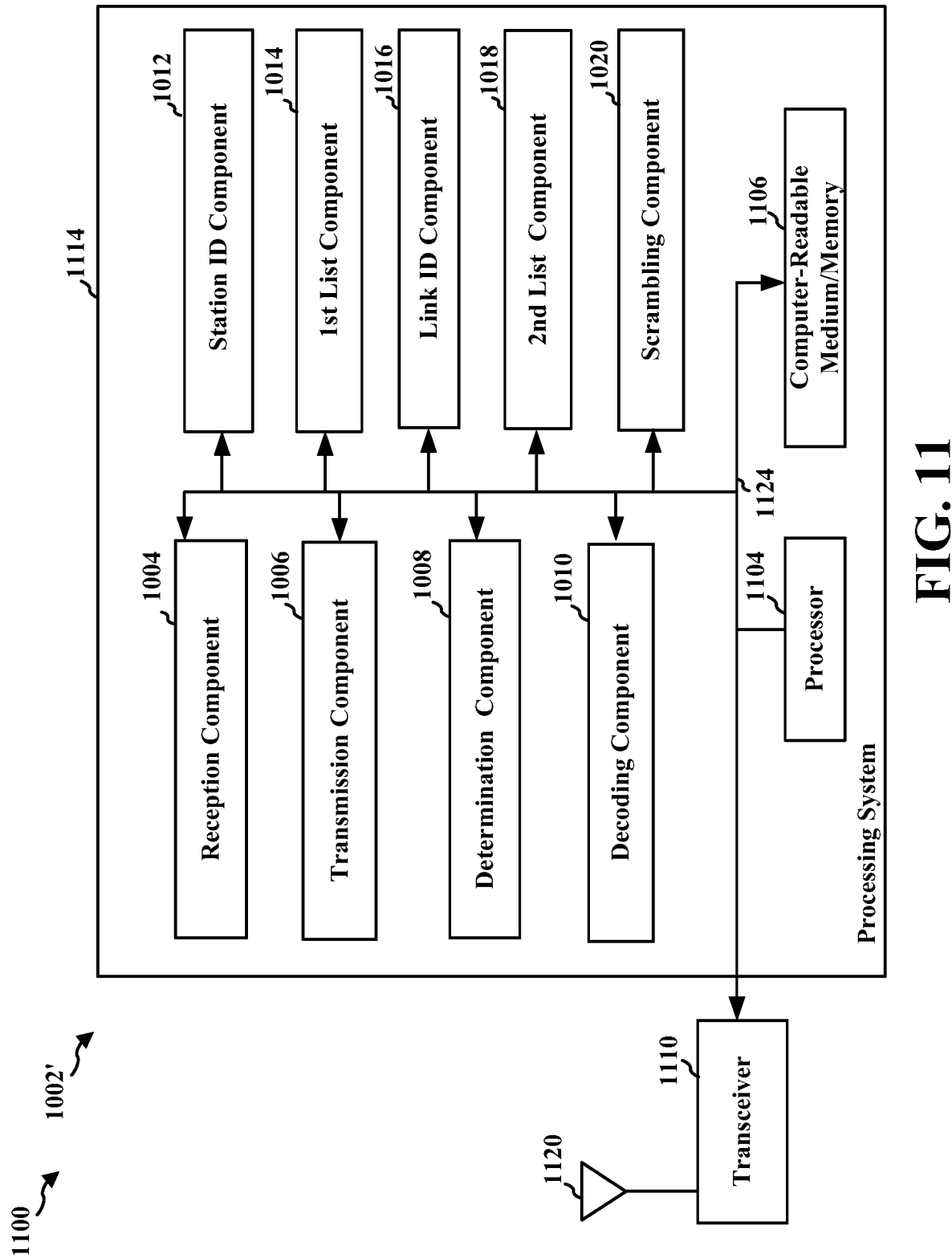
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, 1018, 1020 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016, 1018, 1020. The components may be software components running in the processor 1104, resident/stored in the computer readable medium/memory 1106, one or more hardware components coupled to the processor 1104, or some combination thereof. In one configuration, the processing system 1114 may be a component of the UE 350 and may include the memory 360 and/or at least one of the TX processor 368, the RX processor 356, and the controller/processor 359. Alternatively, the processing system 1114 may comprise the entire UE.

In one configuration, the apparatus 1002/1002' for wireless communication includes means for receiving a control message over a link, where the control message comprises an indication of a source ID and a destination ID for communication over the link. The apparatus may include means for receiving a data message over the link and means for determining whether to attempt to decode the data message received over the link based on the source ID and the destination ID indicated in the control message. In some aspects, where the communication comprises multicast communication, the source ID comprising an application layer ID and the destination ID comprising a group ID for the multicast communication, the apparatus 1002/1002' may further include means for receiving a plurality BSMs and means for determining whether to send feedback for each of the plurality of BSMs based on at least one of a location of the receiving device, a range for a particular BSM message, or a Quality of Service for the particular BSM message. The apparatus may include means for determining a station ID for each BSM from the plurality of BSMs for which the receiving device determines to send the feedback and means for maintaining a first list of station IDs for which the receiving device determines to send the feedback. The apparatus may include means for determining the link ID based on the group ID and the station ID for each station ID in the first list of station IDs; means for maintaining a second list of link IDs for which the receiving device determines to send the feedback; and means for determining whether to send feedback to the transmitting device based on whether the link ID received in the control message is in the second list of link IDs maintained at the receiving device. The apparatus may include means for sending feedback to the transmitting device when the link ID received in the control message is in the second list of link IDs maintained at the receiving device. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a transmitting device, the method comprising:
   determining a source identity (ID) and a destination ID for a sidelink data transmission based on a type of communication of the sidelink data transmission being unicast communication, multicast communication, or broadcast communication, wherein the transmitting device determines a different source ID for different types of communication of the unicast communication, the multicast communication, or the broadcast communication;

transmitting at least one sidelink control message indicating the source ID and the destination ID for the sidelink data transmission, the source ID and the destination ID being based on the type of the communication of the sidelink data transmission; and transmitting the sidelink data transmission associated with the at least one sidelink control message.

2. The method of claim 1, wherein the type of the communication comprises the unicast communication to a single receiving device, the source ID comprising a first data link layer ID for the transmitting device and the destination ID comprising a second data link layer ID for the single receiving device.

3. The method of claim 1, wherein the type of the communication comprises the broadcast communication and the source ID and the destination ID comprise a same ID.

4. The method of claim 3, wherein the source ID and the destination ID both comprise a broadcast group ID.

5. The method of claim 1, wherein the type of the communication comprises the multicast communication, the source ID comprising an application layer ID and the destination ID comprising a group ID.

6. The method of claim 5, wherein the application layer ID comprises a station ID used for a Basic Safety Message (BSM) message from the transmitting device.

7. The method of claim 1, further comprising:
determining a link ID for the communication over a link as a function of the source ID and the destination ID.

8. The method of claim 7, wherein the function comprises a hash map function.

9. The method of claim 8, wherein the hash map function reduces a first number of bits of a combination of the source ID and the destination ID to a second number of bits for the link ID, the second number of bits being smaller than the first number of bits.

10. The method of claim 7, wherein the link ID comprises a unified link ID for the unicast communication, the multicast communication, and the broadcast communication.

11. A transmitting device for wireless communication, the transmitting device comprising:
a memory; and
at least one processor coupled to the memory and configured to:
determine a source identity (ID) and a destination ID for a sidelink data transmission based on a type of communication of the sidelink data transmission being unicast communication, multicast communication, or broadcast communication, wherein the source ID is different for different types of communication of the unicast communication, the multicast communication, or the broadcast communication;
transmit at least one sidelink control message indicating the source ID and the destination ID for the sidelink data transmission, the source ID and the destination ID being based on the type of the communication of the sidelink data transmission; and
transmit the sidelink data transmission associated with the at least one sidelink control message.

12. The transmitting device of claim 11, wherein the type of the communication comprises the unicast communication to a single receiving device, the source ID comprising a first data link layer ID for the transmitting device and the destination ID comprising a second data link layer ID for the single receiving device.

13. The transmitting device of claim 11, wherein the type of the communication comprises the broadcast communication and the source ID and the destination ID comprise a same ID.

14. The transmitting device of claim 11, wherein the type of the communication comprises the multicast communication, the source ID comprising an application layer ID and the destination ID comprising a group ID.

15. The transmitting device of claim 11, wherein the at least one processor is further configured to:
determine a link ID for the communication over a link as a function of the source ID and the destination ID.

16. A method of wireless communication at a receiving device, the method comprising:
receiving at least one sidelink control message indicating a source identity (ID) and a destination ID for a sidelink data message, the source ID and the destination ID being based on a type of communication of the sidelink data message being unicast communication, multicast communication, or broadcast communication, wherein the source ID is different for different types of communication of the unicast communication, the multicast communication, or the broadcast communication;
receiving the sidelink data message associated with the at least one sidelink control message; and
attempting to decode or skipping decoding of the sidelink data message based on at least one of the source ID or the destination ID received in the at least one sidelink control message.

17. The method of claim 16, wherein the type of the communication comprises the unicast communication from a transmitting device to the receiving device, the source ID comprising a first data link layer ID for the transmitting device and the destination ID comprising a second data link layer ID for the receiving device.

18. The method of claim 16, wherein the type of the communication comprises the broadcast communication from a transmitting device, the source ID comprising a first data link layer ID for the transmitting device and the destination ID comprising a broadcast group ID.

19. The method of claim 16, wherein the type of the communication comprises the broadcast communication from a transmitting device and the source ID and the destination ID comprise a same ID.

20. The method of claim 19, wherein the source ID and the destination ID both comprise a broadcast group ID.

21. The method of claim 16, wherein the type of the communication comprises the multicast communication, the source ID comprising a first data link layer ID for a transmitting device and the destination ID comprising a group ID for the multicast communication.

22. The method of claim 16, wherein the type of the communication comprises the multicast communication, the source ID comprising an application layer ID and the destination ID comprising a group ID for the multicast communication.

23. The method of claim 22, wherein the application layer ID comprises a station ID used for a Basic Safety Message (BSM) message from a transmitting device.

24. The method of claim 22, further comprising:
receiving a plurality of Basic Safety Messages (BSMs);
sending feedback or skipping transmission of the feedback for each of the plurality of BSMs based on at least one of a location of the receiving device, a range for a particular BSM message, or a Quality of Service for the particular BSM message; and maintaining a first list of station IDs including a station ID for each BSM to which the receiving device sends the feedback.

25. The method of claim 24, further comprising:

determining a link ID based on the group ID and the station ID for each station ID in the first list of station IDs; and maintaining a second list of link IDs for which the receiving device determines to send the feedback, the second list of link IDs including the link ID for each station ID in the first list of station IDs, each link ID being based on the group ID and the station ID for a corresponding station ID.

26. The method of claim 25, further comprising:

sending the feedback to a transmitting device when the link ID received in the at least one sidelink control message is in the second list of link IDs maintained at the receiving device.

27. The method of claim 26, further comprising:

scrambling the feedback using a scrambling sequence based on at least one of the link ID for a link or the station ID for a corresponding BSM.

28. The method of claim 27, wherein the scrambling sequence is further based on a cyclic redundancy check (CRC) of the at least one sidelink control message.

29. The method of claim 16, wherein the source ID and the destination ID are indicated in a link ID, and wherein the link ID is generated based on a hash map function that reduces a first number of bits of a combination of the source ID and the destination ID to a second number of bits for the link ID, the second number of bits being smaller than the first number of bits.

30. A receiving device for wireless communication, the receiving device comprising:

a memory; and at least one processor coupled to the memory and configured to:

receive at least one sidelink control message indicating a source identity (ID) and a destination ID for a sidelink data message, the source ID and the destination ID being based on a type of communication of the sidelink data message being unicast communication, multicast communication, or broadcast communication, wherein the source ID is different for different types of communication of the unicast communication, the multicast communication, or the broadcast communication;

receive the sidelink data message associated with the at least one sidelink control message; and attempt to decode or skip decoding of the sidelink data message based on at least one of the source ID or the destination ID received in the at least one sidelink control message.

* * * * *